A. ARATO.
SHORT TURNING GEAR FOR TRAILERS.
APPLICATION FILED MAR. 11, 1916.

1,294,859. Patented Feb. 18, 1919.
2 SHEETS—SHEET 1.

Achille Arato, Inventor

A. ARATO.
SHORT TURNING GEAR FOR TRAILERS.
APPLICATION FILED MAR. 11, 1916.
1,294,859.
Patented Feb. 18, 1919.
2 SHEETS—SHEET 2.
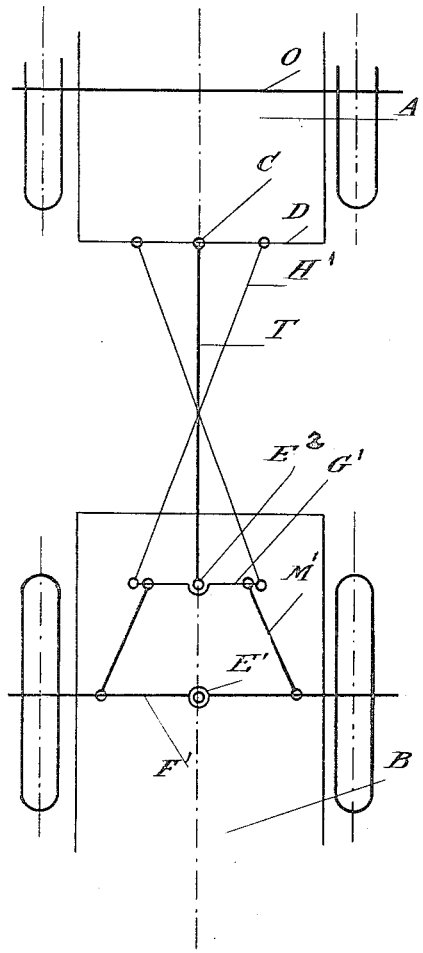
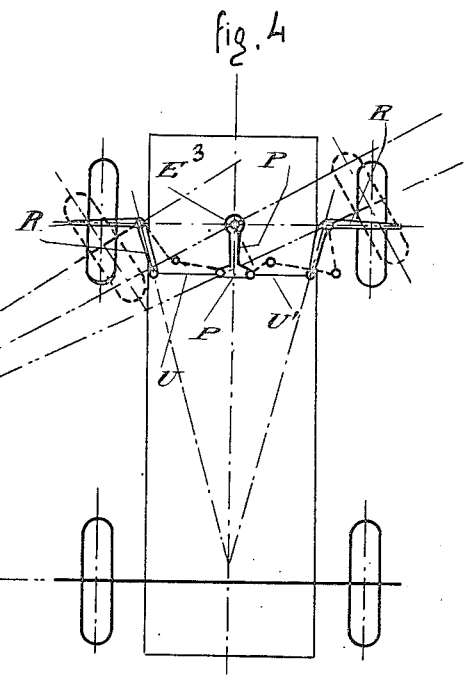
Achille Arato, Inventor.

UNITED STATES PATENT OFFICE.

ACHILLE ARATO, OF TURIN, ITALY.

SHORT-TURNING GEAR FOR TRAILERS.

1,294,859.  Specification of Letters Patent.  Patented Feb. 18, 1919.

Application filed March 11, 1916. Serial No. 83,674.

*To all whom it may concern:*

Be it known that I, ACHILLE ARATO, residing in Turin, Italy, have invented certain new and useful Improvements in Short-Turning Gears for Trailers, of which the following is a full, clear, and exact specification.

The present invention has for its object to provide a device which can be applied to four-wheel cars of the usual type, that is having a fixed rear axle and a front axle rotating as to the car, for the purpose of making said cars, when used as trailers, to travel exactly in the track of the tractor.

Figure 1:
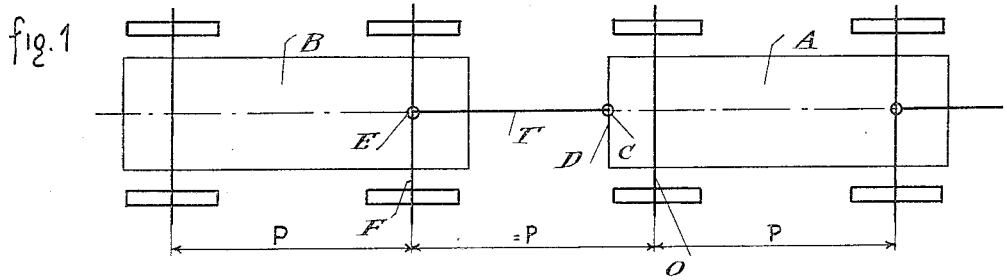
Figure 2:
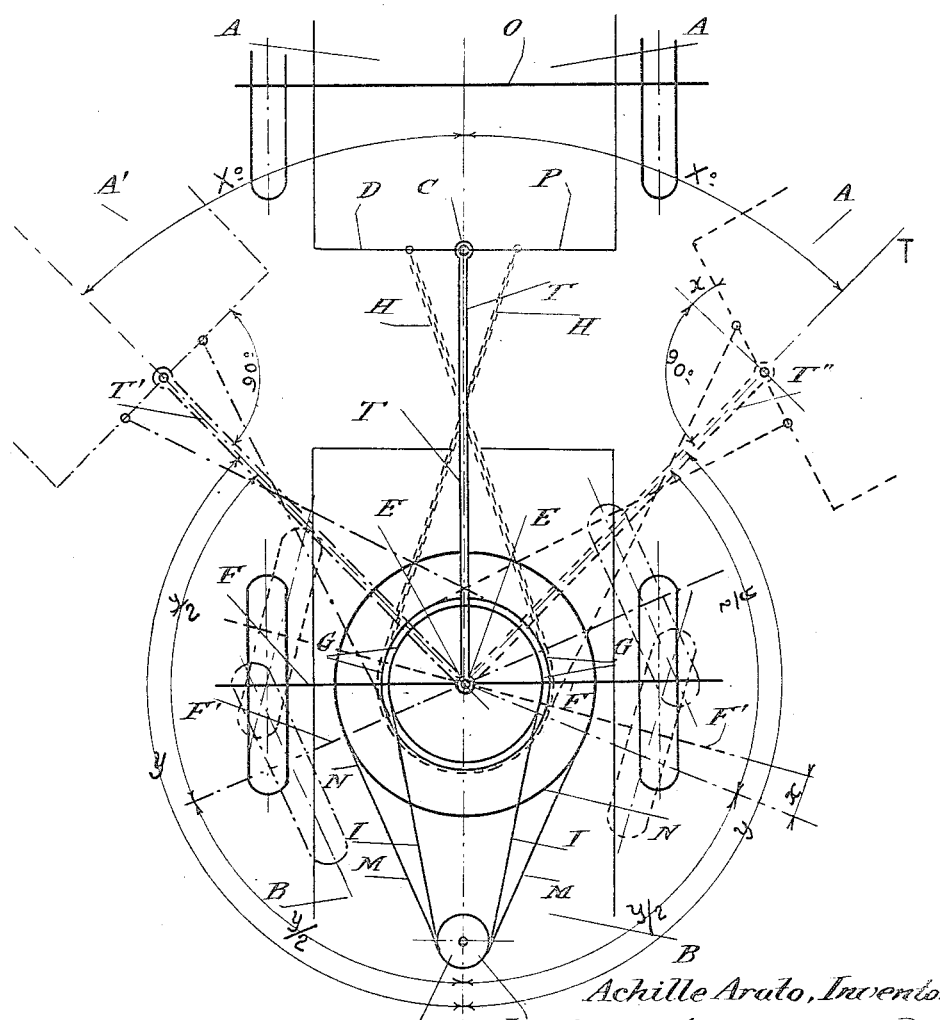

Figures 1 and 2 of the annexed drawings illustrate by way of example and schematically a form of practical application of my invention; and Figs. 3 and 4 are similar views of modifications.

Referring to Figs. 1 and 2 A is the tractor or motor lorry and B the trailer. The former is connected to the latter by means of the pole T pivoted at C to the rear cross bar D of the tractor A and pivoted on pin E at the central point of the rotating front axle F of the trailer B. Loosely mounted on the pin E is the double wheel or pulley G on which runs a rope or chain H, the ends of which are connected to the cross bar D of the tractor, and an endless rope or chain I from the pulley G drives the transmitting wheel L. On the wheel L runs the rope or chain M which drives a wheel or pulley N concentrically as to the second or driven wheel G mounted solidarily with the front axle of the trailer B. Any rotation of the pole T as to the axle of the car B will be proportionally transmitted and in the same direction to the axle F while any rotation of the pole T as to the cross bar D will be proportionally transmitted but in the opposite direction to the axle F. Should both rotations take place at the same time, then to the axle F will be imparted a rotation which is the sum or the difference of the two rotations proportionally transmitted to the same. This effect is shown by means of the dotted lines in the drawing in which to the position A' T' of the tractor A and of the pole T corresponds the position F' of the axle F, and to the position A'' T'' of the tractor A and pole T correspond the position F'' of the axle F. When the distance between the rear axle of the tractor A and the front axle of the trailer B (that is between the axles O and F) is equal to the axle base of the trailer B, the ratio of the wheel or pulley G to the wheel N shall be as 1:2 in order to make the trailer to follow exactly the track of the tractor.

When the distance between the axles O and F is larger or shorter than the axle base of the car B, the ratio 1:2 of wheel G to wheel N ought to be slightly increased or reduced in order to obtain the desired effect of causing the trailer to travel exactly in the track of the tractor. It is obvious that corresponding ratios can be established as to the rear cross bar D, the pole T and the axle F by means either of levers, wheels, pulleys, ropes or chains or gearings, and the form illustrated has been chosen among the numerous ones that can be adopted with good results. The construction shown in Fig. 3 can be for instance adopted with success.

In this figure, the tractor A is connected to the trailer B by means of the pole T pivoted at C and $E^2$. The wheel G of Fig. 2 is here substituted by the lever G' which is connected to the cross bar D by means of the ropes or chains H'; the wheel N is substituted by the axle F' which turns on the pivot E'. The axle F' is connected to the lever G' by means of the drawing rods M'. In this case too by making the ratio of lever G' to F' as 1:2, and the distance between pivot $E^2$ and the front axle of the tractor being equal to the distance between the same pivot $E^2$ and the rear axle of the trailer B, it will follow that the car B will travel exactly in the track of the tractor A.

The two described constructions, though apparently dissimilar, are both characterized by the fact that all movements of rotation of the steering bar or pole T both with reference to the axle of the trailer B and to the cross bar D, as well as all other rotation which might take place at the same time, are transmitted to the axle F at a predetermined ratio and in the desired direction for the purpose of making the trailer to exactly follow the track of the tractor.

The same disposition can be adopted with the same good results to cars having the front wheels rotatably mounted on steering swivels or knuckles by simply substituting for the axle F the lever P, pivoted at $E^3$ and connected with the steering swivels R by means of the drawing-rods U and U' (see Fig. 4).

In the practice and on account of the kind of the soil and of other circumstances skidding of the wheels might take place which will hinder the desired effect. It will then be necessary to provide means for altering the ratio of the rotations transmitted from the pole to the axles, by causing for instance the trailers to make a curve of a greater radius than the one described by the tractor, said curve being practically reduced to the exact track of the tractor on account of the skidding which takes place.

What I claim is:

1. The combination with a tractor, of a trailer having a front axle provided with a central pivot, a pole having one end pivoted to the rear end of the tractor and its other end pivoted upon the central pivot, a pulley carried by the central pivot and having connection with the axle to turn it, and a flexible element extending about the pulley and projecting forwardly in crossed relation with its ends attached to the rear end of the tractor upon opposite sides of the pivot of the forward end of the pole.

2. The combination with a tractor, of a trailer having a front axle pivoted thereto, a pole pivoted to the tractor and secured to the pivot of the front axle, a pulley carried by the pivot of the front axle and having connection with the front axle to turn it, and a flexible element extending about the pulley and projecting forwardly with its ends secured to the tractor upon opposite sides of the forward end of the pole.

3. The combination with a tractor, of a trailer having a front axle provided with a central pivot, a pole having one end pivoted to the tractor and its opposite end pivoted upon the central pivot, a turning member pivoted upon the central pivot, a second turning member secured to the front axle, means connecting the first and second named turning members, and elements secured to the first named turning member and extending forwardly therefrom in crossed relation and attached to the tractor upon opposite sides of the forward end of the pole.

4. The combination with a tractor and a trailer, of a pivoted member on the trailer and connected with the front axle thereof, crossed members connected with the pivoted member and the rear of the tractor, and a pole having one end pivoted to the rear of the tractor and its other pivotally mounted on the pivot of the said pivoted member.

In witness whereof, I have hereunto signed my name in the presence of two subscribing witnesses.

ACHILLE ARATO.

Witnesses:
ANDRE LUINO,
NORAH WHITESTONE.